No. 887,093. PATENTED MAY 12, 1908.
E. G. HOFFMANN.
TRANSMISSION GEARING FOR AUTOMOBILES.
APPLICATION FILED DEC. 9, 1907.
2 SHEETS—SHEET 2.
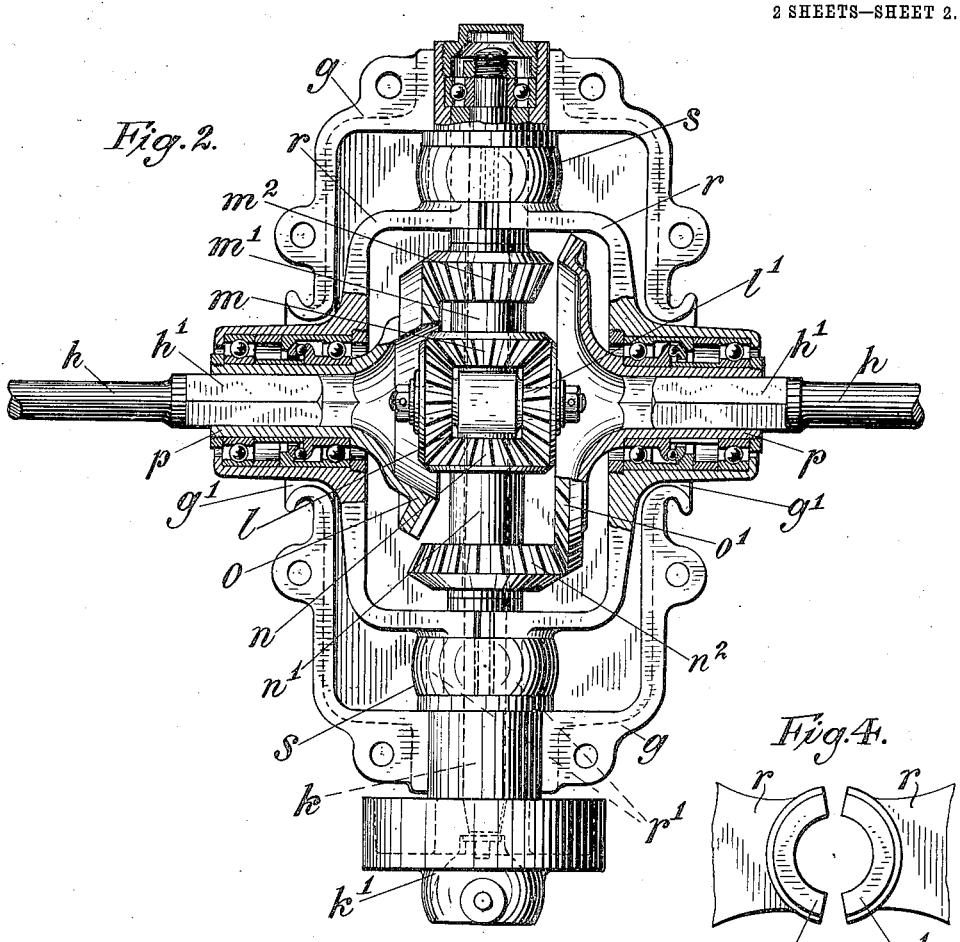
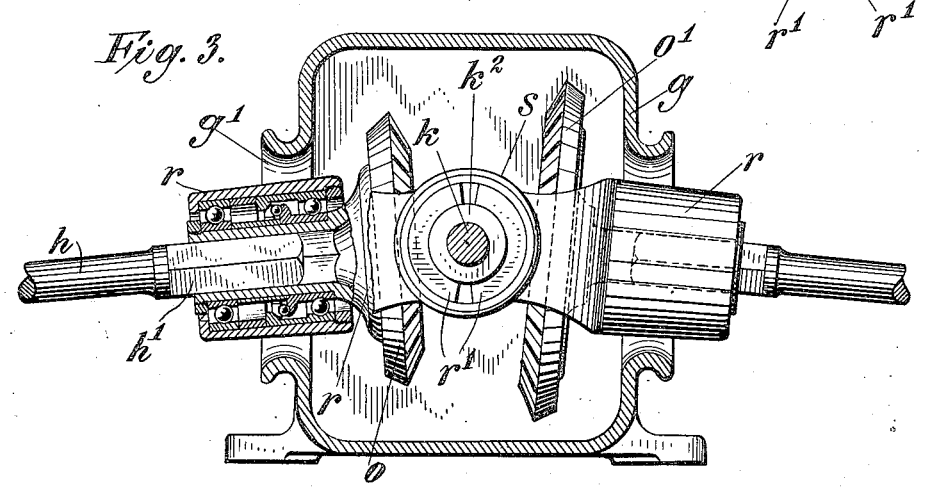
Witnesses
Ella J. Kruger
Geo. Schwarz
Inventor
Ernst Gustav Hoffmann
By his Attorneys
Redding, Kiddle & Greeley

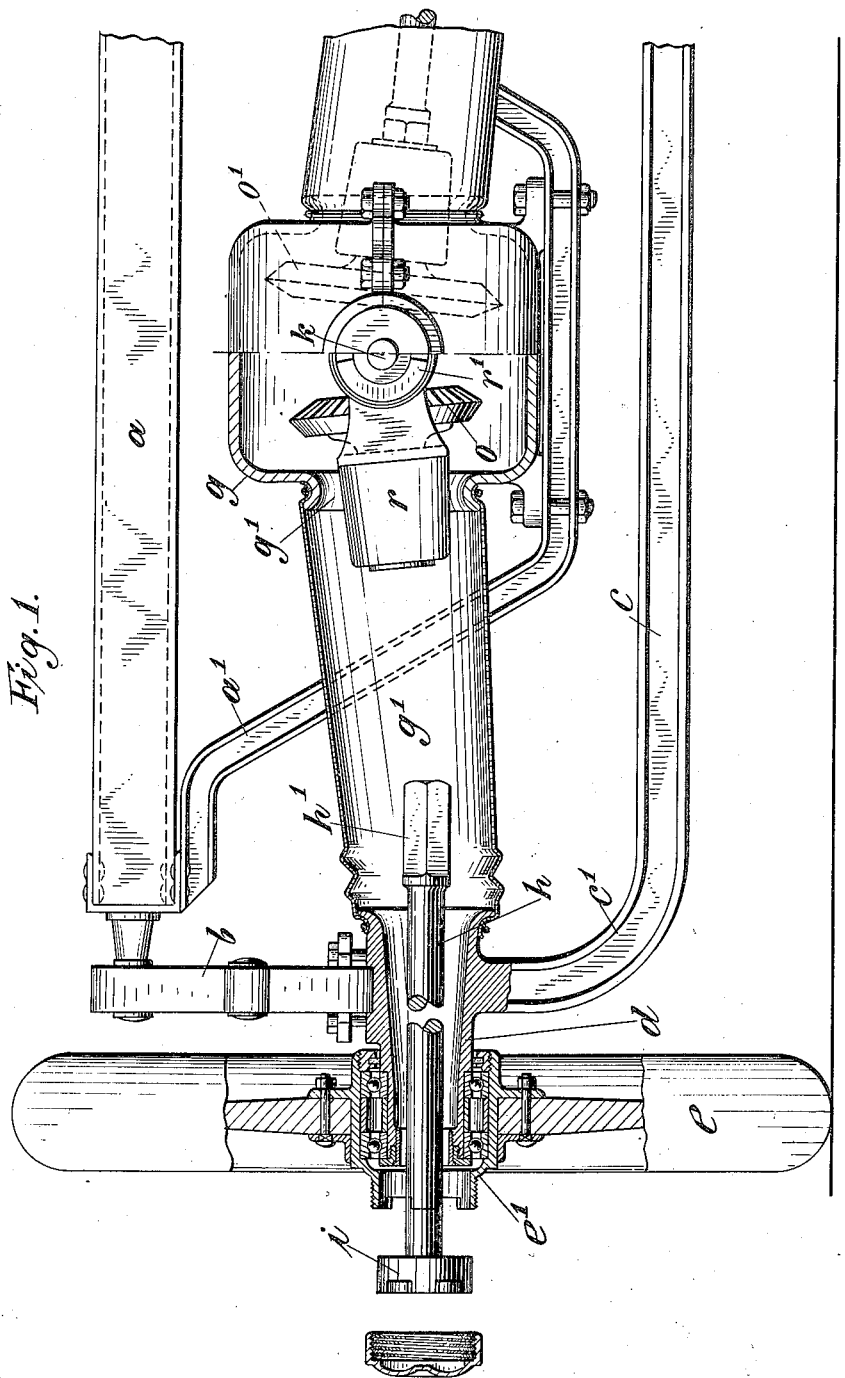

UNITED STATES PATENT OFFICE.

ERNST GUSTAV HOFFMANN, OF NEW ROCHELLE, NEW YORK.

TRANSMISSION-GEARING FOR AUTOMOBILES.

No. 887,093.          Specification of Letters Patent.          Patented May 12, 1908.

Application filed December 9, 1907. Serial No. 405,686.

*To all whom it may concern:*

Be it known that I, ERNST GUSTAV HOFFMANN, a citizen of the United States, residing in the city of New Rochelle, in the county of Westchester, in the State of New York, have invented certain new and useful Improvements in Transmission-Gearing for Automobiles, of which the following is a specification, reference being had to the accompanying drawings, forming a part hereof.

This invention relates to driving mechanism for automobiles in which the two driving road wheels are themselves driven by a two part shaft or axle, the shaft or axle being in two parts so as to permit independence of movement of the two road wheels under certain conditions, as in making a turn. Usually each part of the shaft or axle is connected directly to the corresponding road wheel, but sometimes, as in heavy vehicles, each part of the shaft carries a pinion which meshes directly with the gear on the road wheel. The two parts of the axle are usually driven from a common source through a differential gear, but they may also be driven by separate motors without the interposition of a differential gear. Heretofore it has been the common practice to mount the differential gear or the separate motors directly on the axle so that the weight of these parts is not spring supported. For this and other causes this general system of transmission, generally known as the "live-axle drive", is regarded as unsatisfactory, especially for high powered cars, because of the great weight of the non-spring-supported parts, and the side-chain drive has been used instead, notwithstanding its disadvantages. It has been proposed, however, to support the differential gear or the independent motors upon the car body, so that the weight thereof shall be spring supported, and to provide such connections between the differential gear or motors and the wheels as will permit of relative movement of the wheels and body as the car traverses an uneven road surface, such connections embodying a shaft having a universal connection between one end thereof and the differential gear and a universal connection between the other end thereof and the wheel.

The present invention has for its objects to dispense with one of such universal joints and to secure for the connecting shaft the greatest possible length with a consequent minimum degree of oscillation at the ends thereof, and in accordance therewith the gearing through which the wheel shafts or axles are driven is so constructed and arranged as to permit them to have a free movement of oscillation in vertial planes.

The invention will be more fully explained hereinafter with reference to the accompanying drawings in which one of various possible embodiments is illustrated, and in which—

Figure 1 is a rear view, partly in elevation and partly in section, of so much of an automobile as is necessary to enable the application thereto of the present improvements to be understood, one of the driving axles being represented as partly withdrawn as well as broken out to save space. Fig. 2 is a detail view on a larger scale, partly in plan and partly in horizontal section, of the improved gearing. Fig. 3 is a view thereof partly in end elevation and partly in transverse section. Fig. 4 is a detail view of parts to be referred to.

In the embodiment of the invention illustrated in the drawings, particularly in Fig. 1, the body of the vehicle, sufficiently represented at $a$, is shown as supported through the usual leaf springs $b$ upon an axle $c$. The latter is shown as dropped, as at $c'$, so that each hollow axle end $d$ is accessible from its inner end as well as from its outer end. Each driving road wheel $e$ is journaled upon the hollow axle end $d$. The driving mechanism, with which the invention is particularly concerned, is directly supported by the body $a$ of the vehicle, through the medium of a suitable hanger $a'$ and is, therefore, spring supported with reference to the axle $c$ and wheels $e$.

In the construction illustrated an intermediate shaft $h$ is shown as interposed between the driving mechanism and the corresponding wheel $e$, to which it is connected, preferably with the outer end of the wheel hub $e'$, through universal joints, indicated at $i$, and the gear casing $g$, which is directly supported on the hanger $a'$, is represented as connected with the hollow axle end $d$ by a flexible leather casing $g'$, which excludes dust and dirt without interfering with the relative movement of the gear casing and axle end. It will be obvious, as this description proceeds, that the driving mechanism might be of any suitable character and operated from any suitable source. The embodiment of the invention chosen for illustration comprises a differential gear which, although of ordinary construction, will be briefly described in order that the relation of the present improvements to the driving mechanism will be clearly understood.

As shown in Fig. 2 of the drawings, a short longitudinal shaft $k$, having at one end a universal joint $k'$, is mounted in suitable bearings in the gear casing $g$ and carries, upon a transverse axis, bevel pinions $l$, and $l'$ which mesh respectively with the pinions $m$ and $n$. The pinion $m$ has secured thereto, through a sleeve $m'$, a bevel pinion $m^2$, and the pinion $n$ likewise has secured to it, through a sleeve $n'$, a bevel pinion $n^2$. Each of the pinions $m^2$ and $n^2$ meshes, respectively, with a corresponding bevel gear $o$, $o'$, which is so mounted as to be capable of oscillating or rocking about the longitudinal axis of the shaft $k$ and therefore of the motor vehicle. The particular manner of mounting the bevel gears $o$ and $o'$, so as to permit them to have an oscillating or rocking motion, and of connecting them to the driving wheels $e$ may be varied to suit the varying conditions of use. As shown, however, each gear $o$ and $o'$ has an extended, hollow hub $p$, the bore of which is elongated in cross section, to receive with freedom for longitudinal movement, the correspondingly shaped end $h'$ of the corresponding shaft $h$. The hub $p$ is mounted, with suitable ball bearings, in a yoke $r$ which is extended through a vertically elongated opening $g'$ in the side wall of the casing $g$, and is adapted to swing about the axis of the shaft $k$. The yokes $r$ may be supported in any convenient manner. As shown, each has a hub $r'$, somewhat less than 180 degrees in extent, as clearly shown in Fig. 4, which is fitted to the shaft $k$ or to a sleeve $k^2$ thereon, the two opposing hubs being held in place by a sleeve $s$ which is slipped over them. The yokes $r$ are thus free to swing about the axis of the shaft $k$ and the gears $o$ and $o'$, swinging therewith about the axes of the pinions $m^2$ and $n^2$, remain in mesh therewith and are driven thereby.

Whether the particular construction and arrangement of the gearing shown and described herein or with any other suitable driving mechanism, the entire weight of the gearing, whether differential or otherwise, may be carried by the vehicle body, and, therefore, be spring supported, while a universal joint need be provided at the outer end only of each intermediate shaft. Relative vertical movement of the vehicle body and the wheels, as the vehicle moves over an uneven road surface, is thus permitted, while, as the axis of oscillation of the gears in the construction and arrangement shown and described coincides with the central longitudinal plane for the vehicle, the distance between such axis of oscillation and the center of oscillation of the universal joints between each intermediate shaft and the corresponding wheel is the maximum possible, and the angle of oscillation at each end of the intermediate shaft is the minimum, as is highly desirable.

It will be obvious that in other constructions embodying the invention such as employ a separate gearing for each wheel, as for instance a bevel gearing or a worm gearing, the latter may be placed so near together that their fulcra will be substantially coincident with the center line of the vehicle.

I claim as my invention:

1. In a motor vehicle, the combination of a spring supported body, an axle, a road wheel journaled upon the axle, driving mechanism supported by the body and comprising a driving wheel mounted upon a substantially longitudinal axis and a driven wheel mounted upon a transverse axis with freedom for oscillation about said longitudinal axis, and operating connections between said driven wheel and the corresponding road wheel.

2. In a motor vehicle, the combination of a spring supported body, an axle, a road wheel journaled upon the axle, driving mechanism supported by the body and comprising a driving wheel mounted upon a substantially longitudinal axis and a driven wheel mounted upon a transverse axis with freedom for oscillation about said longitudinal axis, and an intermediate transverse shaft operatively connected with said driven wheel at one end and with the corresponding road wheel at the other end.

3. In a motor vehicle, the combination of a spring supported body, an axle, a road wheel journaled upon the axle, driving mechanism supported by the body and comprising a driving wheel mounted upon a substantially longitudinal axis and a driven wheel mounted upon a transverse axis with freedom for oscillation about said longitudinal axis, and an intermediate transverse shaft operatively connected with said driven wheel at one end and, through a universal joint, with the corresponding road wheel at the other end.

4. In a motor vehicle, the combination of a spring supported body, an axle, a wheel journaled upon a substantially longitudinal axis and a bevel gear mounted upon a transverse axis with freedom for oscillation about said longitudinal axis, and an intermediate transverse shaft operatively connected with the last named gear at one end and, through a universal joint, with the corresponding wheel at the other end.

5. In a motor vehicle, the combination of a spring supported body, an axle, a road wheel journaled upon the axle, driving mechanism supported by the body and comprising a driving wheel mounted upon a substantially longitudinal axis and a driven wheel mounted upon a transverse axis, a yoke mounted to oscillate about said longitudinal axis and supporting said driven wheel, and an intermediate transverse shaft operatively connected with the driven wheel at one end and, through a universal joint, with the corresponding road wheel at the other end.

6. In a motor vehicle, the combination of a spring supported body, an axle, a road wheel journaled upon the axle, driving mechanism supported by the body and comprising a bevel gear mounted upon a substantially longitudinal axis, and a bevel gear having an elongated hub, a yoke mounted to oscillate about said longitudinal axis and having a bearing for the hub of the last named gear, and an intermediate transverse shaft operatively connected with the last named gear at one end and, through a universal joint, with the corresponding road wheel at the other end.

7. In a motor vehicle, the combination of a spring supported body, an axle, wheels journaled upon the axle, differential gear supported by the body and comprising bevel gears mounted upon a substantially longitudinal axis, yokes mounted to oscillate about said longitudinal axis, bevel gears supported by said yokes respectively in mesh with the first named bevel gears respectively, and intermediate transverse shafts operatively connected with the last named gears respectively and, through universal joints, with the corresponding road wheels.

8. In a motor vehicle, the combination of a spring supported body, an axle, wheels journaled upon the axle, differential gear supported by the body and comprising bevel gears mounted upon a substantially longitudinal axis, yokes mounted to oscillate about said longitudinal axis, bevel gears supported by said yokes respectively in mesh with the first named bevel gears respectively, and intermediate transverse shafts operatively connected with the last named gears respectively and, through universal joints, with the corresponding road wheels at their outer ends.

This specification signed and witnessed this 4th day of December, A. D., 1907.

ERNST GUSTAV HOFFMANN.

Witnesses:
  W. B. GREELEY,
  AMBROSE L. O'SHEA.